United States Patent [19]

Aeschbacher et al.

[11] Patent Number: 5,124,187
[45] Date of Patent: Jun. 23, 1992

[54] ADHESIVE SHEET MATERIALS FOR SIGNMAKING MACHINES

[76] Inventors: Lori L. Aeschbacher, 4929 N. Woodburn, Whitefish Bay, Wis. 53215; Richard J. Kiley, 4365 N. 145 St., Brookfield, Wis. 53005; George F. Jambor, W55 N228 Woodmere Ct., Cedarburg, Wis. 53012; Brian P. Connolly, 3228 W. Chateau Ct., Mequon, Wis. 53092; John H. Kiekhaefer, 1329 E. Randolph Ct., Milwaukee, Wis. 53212

[21] Appl. No.: 595,079
[22] Filed: Oct. 10, 1990
[51] Int. Cl.$^5$ .............................. B32B 3/00
[52] U.S. Cl. .................... 428/40; 428/195; 428/908
[58] Field of Search ............ 428/40, 195, 908

[56] References Cited

U.S. PATENT DOCUMENTS

| | | | |
|---|---|---|---|
| 3,490,362 | 1/1970 | Massari | 101/28 |
| 3,558,425 | 1/1971 | Massari | 161/232 |
| 4,014,257 | 3/1977 | Bettenhausen | 101/26 |
| 4,604,153 | 8/1986 | Melbye | 156/235 |
| 4,678,690 | 7/1987 | Palmer et al. | 428/31 |
| 4,867,056 | 9/1989 | de Gelder et al. | 101/19 |

FOREIGN PATENT DOCUMENTS 1273895 5/1987 United Kingdom ............ 428/40

Primary Examiner—Patrick J. Ryan
Assistant Examiner—Kam T. Lee
Attorney, Agent, or Firm—Quarles & Brady

[57] ABSTRACT

Adhesive sheet material (10) for signmaking machines including a carrier tape (20), a release liner (16) and a sign tape (21,21') between the carrier tape (20) and release liner (16). Either the carrier tape (20) or release liner (16) has a high degree of elongation, and characters are defined in the sign tape (21, 21') by contacting the high elongation carrier tape (20) or release liner (16) with a character-forming tool of a signmaking machine.

8 Claims, 3 Drawing Sheets

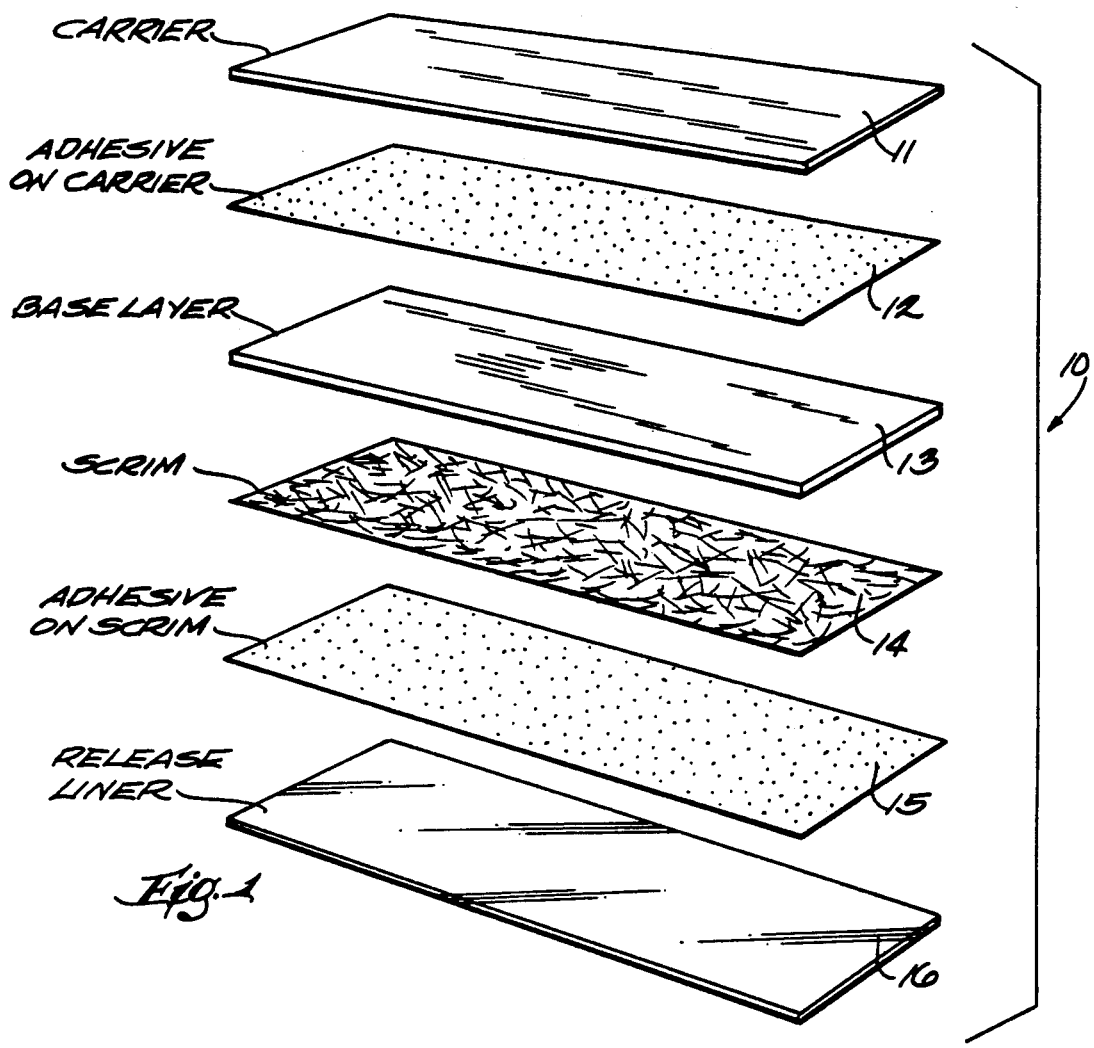
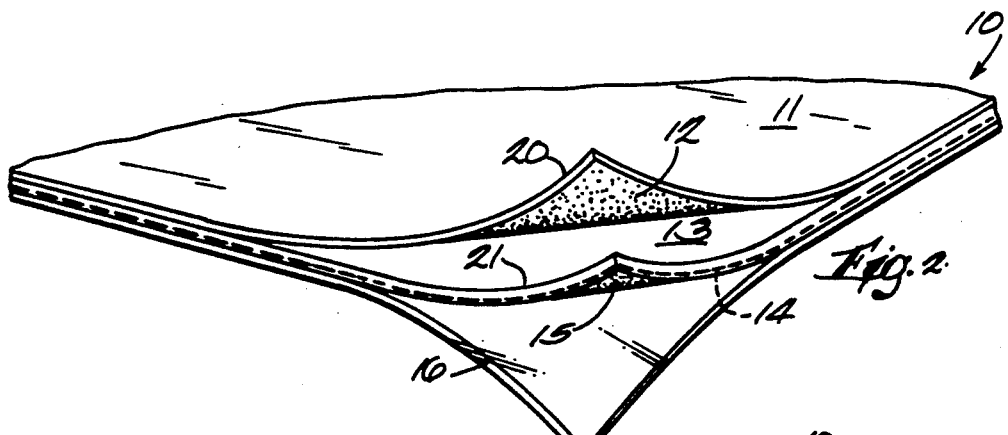
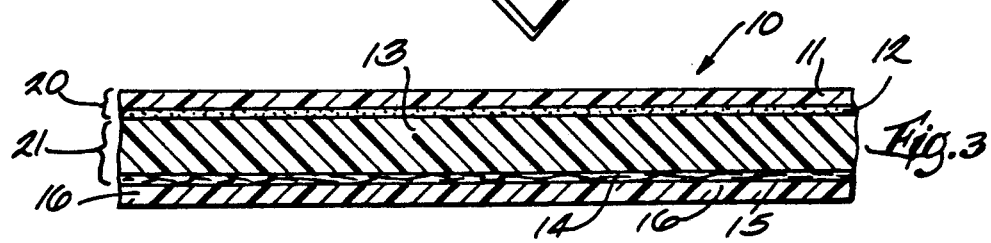

ADHESIVE SHEET MATERIALS FOR SIGNMAKING MACHINES

FIELD OF THE INVENTION

The present invention relates to the field of adhesive sheet materials for use in various types of signmaking apparatus with which a sign comprising alphanumeric information or other symbols is cut or otherwise formed in a layer of sheet material having pressure sensitive adhesive, following which the cut sign is separated from the sheet material for affixation to a surface.

BACKGROUND OF THE INVENTION

Several types of signcutting apparatus suitable for forming signs from adhesive sheet material are known in the graphic arts field, and adhesive sheet materials for use in such machines are available commercially. The machines are used to cut signs which may consist of letters, numbers, symbols, designs etc., including combinations thereof, as required to convey the desired information. The signs may be used primarily for information purposes, such as signage used in factories and other industrial or commercial facilities, or for decorative purposes.

An early form of signcutting apparatus is disclosed in U.S. Pat. No. 3,490,362, Massari, 1970, which involves indirect cutting of an element of adhesive sheet material used to form a sign; the adhesive sheet material is further described in U.S. Pat. No. 3,558,425, Massari, 1971. As taught by this patent, the adhesive sheet material is a three layer construction consisting of a relatively thick and inflexible film coated with pressure sensitive adhesive that is sandwiched between a highly flexible polyester carrier film along its one surface and a relatively inflexible release liner over its adhesive layer. The machine disclosed in U.S. Pat. No. 3,490,362 includes dies which contact, but do not cut, the flexible carrier film, and force is transmitted through the carrier to cut a sign in the intermediate inflexible film material. Thus, the die does not directly contact or penetrate the intermediate layer in this method of sign cutting. Similar techniques and sheet materials are also disclosed in U.S. Pat. No. 4,014,257, Bettenhausen, 1977; U.S. Pat. No. 4,604,153, Malbye, 1986; and U.S. Pat. No. 4,867,056, Anderson et al., 1989. Three layer adhesive sheet material for this type of signcutting machine is sold commercially by Reynolds/Leteron Manufacturing Co. (Inc.).

Microprocessor controlled X-Y plotters have come into widespread use in recent years in the graphic arts industry and they have been employed to provide a second type of signcutting apparatus for producing signs from pressure sensitive adhesive sheet materials. The plotter type of signmaking machines use a knife or razor as a tool for cutting signs in adhesive sheet materials. Movement of the knife and sheet material in a machine of this type are directed by a CPU and programmed instructions so as to cut the sheet material in a sign of the selected configuration. This type of machine is disclosed in a number of U.S. patents, including: U.S. Pat. No. 4,367,588, Herbert, 1983; U.S. Pat. No. 4,467,525, Logan et al., 1984; U.S. Pat. No. 4,512,839, Gerber, 1985; U.S. Pat. No. 4,608,891 Frisby et al., 1986; U.S. Pat. No. 4,732,069, Wood et al., 1988; and U.S. Pat. No. 4,794,542, Proctor 1988. Plotter-type signcutting machines are sold commercially by a number of companies, including Scott Machine Development Corporation, Gerber Scientific and Computer Talk Inc. These machines use a two-layer adhesive sheet material construction consisting of a base tape such as a plastic film coated with adhesive, and a release liner over the adhesive. The base tape is contacted directly by the cutting tool of the machine which penetrates the base tape through to the liner.

A new signmaking apparatus not publicly disclosed at the filing date of this patent is described in a commonly-assigned co-pending patent application identified below which utilizes a dual-acting solenoid to rapidly reciprocate a plunger to form a sign in adhesive sheet material. The new machine is capable of forming signs with various types of adhesive sheet materials.

We have developed new adhesive sheet materials for signmaking apparatus to provide a material having improved physical characteristics, such as with respect to tear resistance and cuttability. Another principal objective of the invention is to provide a novel construction for adhesive sheet material suitable for use with various types of signmaking machines. Another principal objective is to provide an improved adhesive sheet material for sign formation of the type in which a sign tape is sandwiched between a carrier tape and a liner. A more specific objective of the invention is to provide a new adhesive sheet material for signmaking machines that is particularly useful for the new signmaking machine described immediately above. Other objectives of the invention will become apparent from the detailed description which follows.

SUMMARY OF THE INVENTION

Adhesive sheet materials for graphic arts signmaking of the present invention include a sign tape comprising the combination of (1) a base layer, (2) a layer of nonwoven scrim embedded along a surface of or within the base layer, and (3) a layer of pressure sensitive adhesive. A release liner is releasably adhered to the adhesive layer of the sign tape to cover and protect the adhesive until a sign made from the tape is to be applied to an object, and a carrier tape is releasably adhered over the surface of the sign tape opposite from the liner.

DESCRIPTION OF THE DRAWINGS

The present invention is described hereinafter by reference to the following drawings in which:

FIG. 1 is an exploded view of a first pressure sensitive adhesive sheet material in accordance with the present invention;

FIG. 2 is a perspective view of the sheet material of FIG. 1 with its several layers joined together;

FIG. 3 is a sectional view of the sheet material of FIGS. 1 and 2 with the several layers joined together;

DESCRIPTION OF PRESENTLY-PREFERRED EMBODIMENTS

1. FIGS. 1-6

Figure 4:
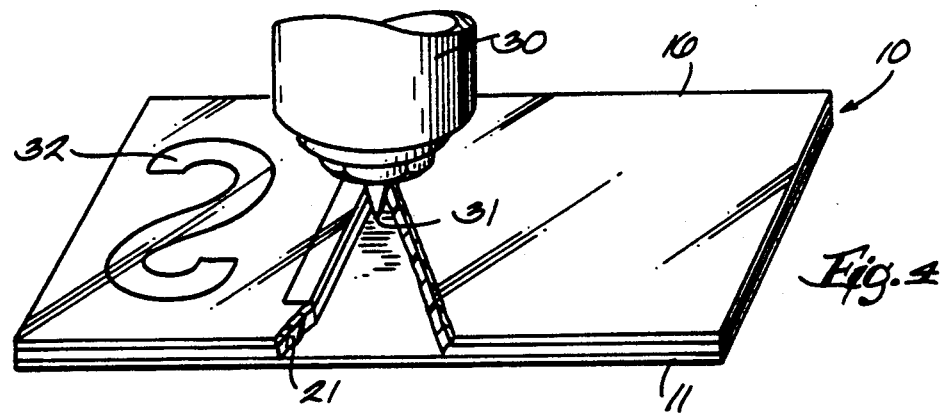
FIG. 4 is a perspective view, with a portion broken away, illustrating one method of forming a sign from the sheet material of FIGS. 1-3.

A pressure sensitive adhesive sheet material 10 of the present invention is illustrated in exploded view in FIG. 1, perspective view in FIG. 2 and sectional view in FIG. 3. As indicated in these drawings, sheet material 10 is a multi-layer structure consisting of carrier layer 11 with a layer of adhesive 12 on its bottom surface, base layer 13, a layer of scrim 14 joined to the layer 13, pressure sensitive adhesive layer 15 on the opposite surface of scrim 14, and a release liner 16 covering adhesive layer 15. Each of these layers is described separately in the succeeding paragraphs (a)-(h). In the following description, the "tack" of an adhesive is determined in accordance with the procedure of ASTM D-2979 using a probe with a 1 cm$^2$ surface that contacts the adhesive; tack is expressed herein in units of grams. The "adhesion" of a pressure sensitive adhesive is measured according to the procedure of the Pressure Sensitive Tape Council, Procedure No. 1, and is expressed in terms of grams/inch of width, which is shortened to grams/inch in the description; adhesion is measured by applying the tape to a steel plate (unless otherwise stated) and measuring the adhesion in accordance with the procedure after 15 minutes of dwell time.

(a) Carrier layer 11 is a layer of flexible material such as plastic film or paper (preferably saturated with thermoplastic resin), that will be used to transfer a sign formed from layer 13 as described later. Carrier layer 11 can be of any appropriate thickness, such as in the range of about 1 to 6 mils thick, with about 4 to 4.5 mils thick being a preferred thickness for the layer.

(b) Adhesive layer 12 is a layer of low tack pressure sensitive adhesive coated onto the underside of carrier layer 11. Adhesive layer 12 is to be releasably adhered to layer 13 during the signmaking operation and while a sign including base layer 13 is stripped from a sheet 10. Further, however, adhesive layer 12 is to release cleanly from layer 13 and remain on the carrier layer 11 when a sign is affixed to a surface. The term "releasably adhered" in this description and in the claims in reference to adhesive layer 12 is defined to mean that the adhesive releases from layer 13 during application of a sign without transfer of adhesive to the base layer. Adhesive layer 12 can be coated onto a surface of the carrier at a thickness of about 0.8 to 1.2 mils, preferably about 1 mil. Various low tack adhesives are appropriate for layer 12, such as a low tack latex adhesive for example. A carrier layer 11 with an adhesive layer 12 of a type having an adhesion to layer 13 in the range of about 140 to 460 grams/inch, preferably about 280 to 400 grams/inch, is especially useful. Adhesive layer 12 can have a tack in the range of about 50 to 100 grams, preferably about 60 to 80 grams.

(c) Carrier layer 11 and adhesive layer 12 form a carrier tape 20 as an exterior element of the composite construction, described below in connection with FIGS. 2 and 3.

(d) Base layer 13 is a layer of plastic film or paper suitable for cutting into a sign. Useful plastic films include those made of acrylic polymers and co-polymers, vinyl polymers and co-polymers, polystyrene, cellulose acetate, polyester and polycarbonate, and appropriate cast or extruded films are commercially available from numerous suppliers. Layer 13 preferably is an acrylic film when the sheet material is used to form signs with the apparatus described below in connection with FIG. 4. Base layer 13 can be in the range of approximately 2 to 10 mils thick, with about 3 to 5 mils thick film being suitable for most signmaking applications in the graphic arts field. Base layer 13 most often will be an opaque layer in a selected color, but also can be a colored translucent or transparent layer, and may even include two or more lamina of different colors to provide a sign in one color against a different background color.

(e) Scrim layer 14 is a layer of nonwoven material which is joined to the surface of layer 13 opposite from the carrier tape, preferably in such fashion as to be wholly or partially embedded in base layer 13. A useful method for combining scrim layer 14 and film layer 13 is described later in connection with FIG. 7. Various materials can be used for scrim layer 14, such as nonwoven scrims of polyester fibers, nylon fibers, paper fibers, polyolefin fibers, glass fibers and blends of two or more of such fibers. Scrim layer 14 may be about 1 mil to 4 mils thick, with a scrim layer of about 1.5 to 2.5 mils thick now being considered optimum. As noted above, scrim layer 14 is to be permanently bonded to or embedded along a surface of layer 13. The scrim is almost invisible along the surface of layer 13 to which it is applied, and is completely invisible from the opposite surface of layer 13, so that it does not in any way detract from the appearance of sign made from the sheet material. For aesthetic reasons, it is most useful to embed scrim layer 14 along the surface of base layer 13 that is covered by adhesive layer 15 described in paragraph (f) below. In general, the thickness of the combination of base layer 13 and scrim layer 14 can be in the range of about 2 mils to 15 mils, preferably about 3 mils to 6 mils, for the materials of the invention; the tensile strength of the combination usually will be in the range of about 5 to 30 lbs./inch of width. It may also be noted that the scrim layer 14 can be joined to the base tape 13 along its surface in contact with carrier tape 20.

(f) Pressure sensitive adhesive layer 15 is joined to the scrim layer 14 opposite from layer 13 by any suitable technique. For example, adhesive layer 15 can be coated over the scrim layer. Also, however, pressure sensitive adhesive layer 15 can be bonded over the scrim layer by a transfer lamination technique in which the adhesive layer 15 is first coated onto a release liner 16, described in paragraph (h) below, and then the exposed surface of adhesive layer 15 is laminated over the scrim layer to become bonded thereto with liner 16 releasably adhered to its opposite surface; when liner 16 is removed, adhesive layer 15 remains adhered over the scrim layer.

Adhesive layer 15 will be employed to adhere a sign cut from base layer 13 onto a selected surface. Many formulations suitable for pressure sensitive adhesive layer 15 are known in the art and commercially available. Pressure sensitive adhesive layer 15 is aggressively and permanently tacky at room temperature and is to firmly adhere to a variety of dissimilar surfaces upon contact with only finger or hand pressure. The tack of adhesive layer 15 can be in the range of about 200 to 1,500 grams, most usefully about 400 to 1,000 grams. Layer 15 can be in the range of about 0.5 to 5 mils thick, with an adhesive layer 15 about 1 to 2 mils thick being appropriate for most sign applications. The adhesive can be transparent, translucent or opaque. Also, the adhesive most usefully is of a type that will separate well, preferably entirely, along the outline of a character cut or otherwise formed in base and scrim layers 13 and 14, and which has a slow rate of flowback after separation.

(g) Base layer 13, scrim layer 14 and pressure sensitive layer 15 are combined to form a sign tape 21 as an interior element of the composite construction, described below in connection with FIGS. 2 and 3.

(h) Liner 16 is releasably adhered over the exposed surface of pressure sensitive adhesive layer 15 in order to protect the adhesive during storage of the sheet material and signmaking operations. Liner 16 will be removed from a sign made from the sheet material to expose adhesive layer 15 for adhering the sign onto a surface. Liner 16 may comprise a layer of paper or plastic film, such as polyethylene, high density polyethylene or polyester, coated or impregnated with a suitable release coating, of which many types are well known in the art such as silicone and carbamate release coatings. The term "releasably adhered" as employed in connection with liner 16 in the description and claims means that the liner can be peeled from the adhesive 15, or the adhesive peeled from the liner, without the adhesive transferring onto the liner. Most usefully, the adhesion of liner 16 to adhesive 15 is less than the adhesion of the carrier tape to base layer 13; the adhesion of the liner to adhesive 15 can be very low, such as in the range of about 10 grams/inch to 40 grams/inch, with an adhesion of about 15 grams/inch providing for excellent release of the liner from the adhesive. Liner 16 will be a second exterior layer of the composite construction as described next in connection with FIGS. 2 and 3.

FIG. 2 illustrates adhesive sheet material 10 with its various layers joined together in the appropriate sequence. Carrier tape 20 consisting of carrier layer 11 and low tack adhesive layer 12 is one exterior layer of the composite construction and release liner 16 is the other exterior layer of the construction. Sign tape 21 consisting of base layer 13 with scrim layer 14 embedded along one of its surfaces and pressure sensitive adhesive layer 15 over the scrim is the interior layer of the composite construction sandwiched between exterior layers 20 and 16. A corner of the sheet is illustrated in FIG. 2 as being separated into layers 20, 21 and 16 to clarify the construction of sheet material 10. The sectional view of FIG. 3 further illustrates the composite multi-layer structure of adhesive sheet material 10.

Sheet material 10 as described above is of a construction suitable for indirect forming of a sign in sign tape 21 by contacting the sheet material with an appropriate apparatus through either liner 16 or carrier tape 20. Whichever of these layers is to be contacted by the signmaking apparatus should have a high elongation, such as at least about 300% elongation, optimally about 500% elongation, and the other exterior layer should have a low elongation such as in the range of about 30% to 100%, optimally about 50% elongation. Thus, sign tape 21 can be formed into a sign by contacting either a high elongation carrier tape 20 or high elongation liner 16 as selected, with suitable dies such as described in previously cited U.S. Pat. Nos. 3,490,362, 4,014,257 and 4,604,153. In this type of indirect signcutting, the dies contact the layer with high elongation and the force is transmitted through said layer to cut the sign tape into the selected sign, even though the die does not directly contact or penetrate the intermediate sign tape. Another apparatus for indirect forming of intermediate base tape layer 21 is the new signmaking machine described below in connection with FIG. 4.

In addition, the sign tape 21 is to have a low elongation of about 1% to 50%, most usefully about 1% to 10%, in order for characters to be formed in the sign tape by a character-forming mechanism contacting a high elongation liner 16 or carrier tape 20 as stated above. Thus, for the adhesive sheet materials of the invention, the sign tape 21 (including base layer 13, scrim 14 and adhesive layer 15) should have a low elongation of about 1% to 50% (especially about 1 to 10%) and either the carrier tape or liner should have a high elongation of at least about 300% (especially about 500%) or higher; the elongation of the other of the carrier tape or liner is less critical but generally should be about 30% to 100%.

Prior art adhesive sheet materials suitable for indirect signmaking have generally employed a layer of acrylic film or vinyl coated paper with adhesive on one surface as the interior layer of the construction. However, we have found that the prior art constructions have disadvantageous characteristics, particularly low tear propagation resistance, which can lead to unsatisfactory separation or "weeding" of the sign from the surrounding waste portion of the sign tape. As used in this description and in the claims "tear propagation resistance" is as determined according to ASTM D-1938, titled Tear Propagation Resistance of Plastic Film and Thin Sheeting by a Single Tear Method. Scrim layer 14 included in sheet material 10 described above is employed to increase the tear propagation resistance of base layer 13 of the construction without adversely affecting cuttability of the sign tape. We have found that the nonwoven structure of scrim layer 14 provides tear propagation resistance in all directions. The following test data demonstrate the manner in which combining scrim layer 14 with a base layer 13 can enhance tear propagation resistance:

(a) base layer 13 consisting of acrylic film 3 mils thick: the tear propagation resistance was measured at 26 grams;

(b) layer 13 consisting of the same 3 mil acrylic film as (a) with a 1.5 mil thick polyester nonwoven scrim layer 14 embedded along one surface of the film: the tear propagation resistance was measured at 260 grams.

The above data show a dramatic ten-fold increase in the tear propagation resistance of a particular layer 13 when constructed according to the invention to include a scrim layer 14. In constructions using other scrim and base layers, tear propagation resistance was increased in the range of about 50% to over 1600% by joining scrim to the base layer. In order to meet the objectives of the present invention, the base layer 13 and scrim layer 14 of the sign tape should have a tear propagation resistance of at least about 40 to 1,000 grams when joined together, most usefully about 250 to 600 grams, in order to ensure good separation of a cut sign from other elements of the sheet material.

The particular materials employed for the various layers described above of sheet material 10 will depend to a large extent upon the characteristics desired for a sign made from the sheet material and the apparatus employed to produce a sign from the sheet material. The following Example 1 describes a specific sheet material 10 developed for a particular signmaking machine described later.

EXAMPLE 1

Sheet material 10 of the following construction was produced and tested for utility for graphic arts signcutting.

(a) Carrier tape 20

A carrier layer 11 of paper saturated with acrylic resin to reduce moisture absorption, with an elongation of about 50%; and layer 12 of low tack pressure sensitive adhesive on one surface of the carrier layer 11 with a adhesion of about 280 grams/inch when characters 2 inches and larger are to be cut from the material, and an adhesive with an adhesion of about 370 grams/inch when characters 2 inches and smaller are to be cut. Total thickness of layers 11 and 12 was about 5 mils.

(b) Sign tape 21

A base layer 13 of acrylic film 3 mils thick; a scrim layer 14 embedded in layer 13 consisting of nonwoven polyester scrim 1.5 mils thick; and a layer of pressure sensitive adhesive 15, 1 mil thick, over the exposed surface of the scrim layer. The base and scrim layers 13 and 14 of the sign tape had a tear propagation resistance of 260 grams and an elongation of about 40% when combined as described.

(c) Liner 16

High density polyethylene coated with silicone, 3 mils thick, with 500% elongation, and having an adhesion to adhesive layer 15 of about 10 grams/per inch.

The sheet material of Example 1 thus comprises a scrim-reinforced pressure sensitive adhesive acrylic film as the sign tape from which signs will be made, covered on one surface by a carrier tape with low tack adhesive, and with a high elongation liner covering the pressure sensitive layer 15 of the sign tape.

Figure 5:
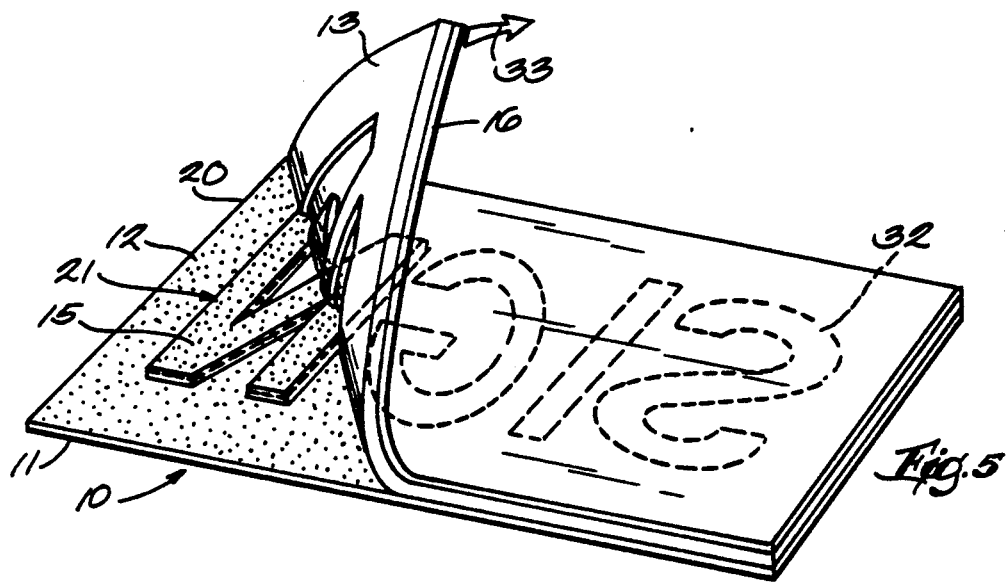
FIG. 5 is a perspective view illustrating the step of removing the sign formed in FIG. 4 from other layers of the material.
Figure 6:
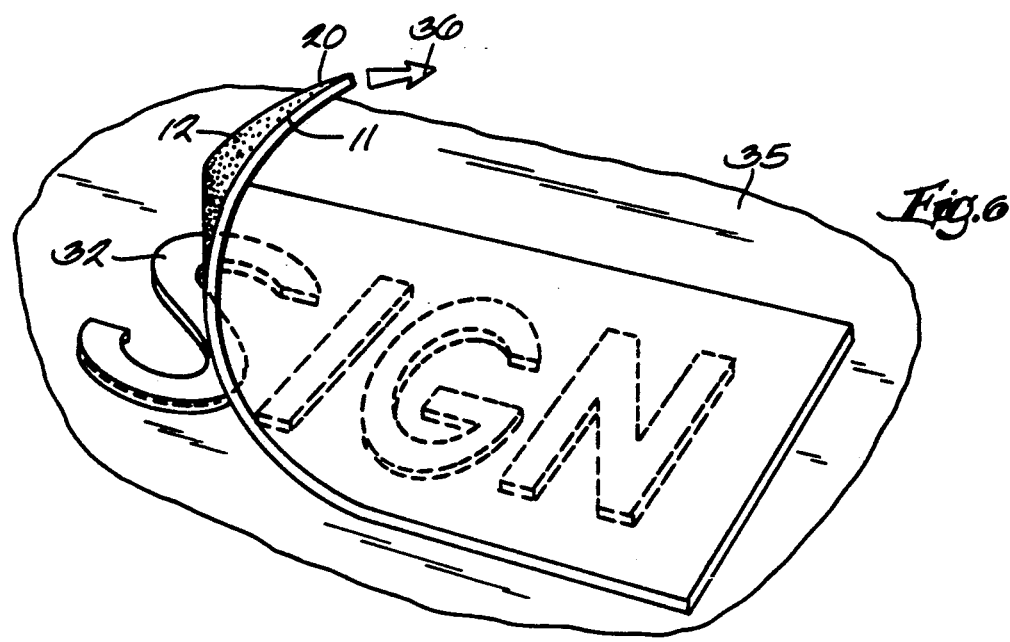
FIG. 6 is a perspective view illustrating the application to a surface of the sign of FIGS. 4 and 5.

FIGS. 4-6 illustrate the operations of forming a sign with the sheet material of Example 1 and application of the sign to a surface.

FIG. 4 depicts sheet material 10 of Example 1 employed to form a sign with the new signmaking apparatus described in commonly-assigned U.S. patent application Ser. No. 07/595,080, filed on even date herewith, entitled Signmaking Machine, Jambor et al., the disclosure of which is incorporated herein by reference for more complete details of the apparatus. Referring to FIG. 4, the new signmaking apparatus includes a dual-acting solenoid 30 driving a plunger 31 at a high rate of speed such as in the range of 500 to 1,000 cycles per second. The solenoid is controlled by a CPU unit and an appropriate program of instructions so as to form a sign as input by an operator with a keyboard. As shown in FIG. 4, sign 32, illustrated as the word SIGN, is cut in sign tape 21 by the solenoid-driven reciprocating plunger 31 contacting liner 16 which is of high elongation as noted in Example 1. The impact force is transmitted through liner 16 to sign tape 21 so as to define the several letters of the sign. The mirror image of the sign is formed in this fashion when liner 16 is the impact layer for indirect sign formation. FIG. 4 shows the letter S completed and the letter I in the process of being formed (or the sign can be formed in the reverse order by first cutting the letter N). The operation of FIG. 4 is continued until an entire sign is formed from the sheet material 10, which can include alphanumeric characters such as letters and numbers, punctuation signs, and the like.

Turning now to FIG. 5, after a complete sign has been formed in sheet material 10 in the manner shown in FIG. 4, the liner 16 and waste portion of sign tape 21 surrounding the characters and any cut-out portions are peeled from the sign and carrier tape, as indicated by arrow 33. During the peeling operation, the letters of the word SIGN formed from sign tape 21 remain releasably adhered to adhesive layer 12 of the carrier tape 20 and are thereby separated from the balance of the sheet material 10. Each letter of the word SIGN consists of a section of base tape 21 including base layer 13, scrim layer 14 and pressure sensitive adhesive layer 15. The entire sign is separated from the balance of sheet material 10 in this fashion so that the complete word SIGN is releasably adhered to a section of carrier tape 20. (The sign also can be separated from sheet material 10 by peeling the carrier tape from the sheet, with the characters being releasably adhered to the carrier tape.)

The cut sign is then applied to a surface 35 in the manner illustrated in FIG. 6. With the letters of SIGN still releasably adhered to a section of carrier tape 20, the adhesive layer 15 on the underside of each letter of SIGN 32 is firmly pressed against surface 35 to adhere the letters to the surface. After this has been completed, carrier tape 20 is peeled from the outer face of the letters in the manner illustrated by arrow 36, during which operation the adhesive layer 12 of the carrier tape cleanly separates from the outer surface of each letter. The adhesion of adhesive 12 to the letters is substantially less than the adhesion of pressure sensitive adhesive layer 15 to surface 35 so that the carrier tape can be peeled from the letters without separating the letters from surface 35.

During development of the present invention, it was found that sheet material 10 of the invention of the type described in Example 1 exhibited excellent cuttability and high tear resistance so that clean cut lines were formed in sign tape 21 during the signmaking operation and, further, that the characters can be readily peeled from the waste portion of sign tape 21 without tearing the letters or waste portion of the sign tape.

The following examples describe additional adhesive sheet materials for signmaking machines made according to our invention.

EXAMPLE 2

A second sheet material 10 was made including the same elements as the sheet material of Example 1 except that the base layer 13 of the sign tape was a plastic film of polystyrene, 3 mils thick. The base and scrim layers of the sign tape had a tear propagation resistance of 280 grams and an elongation of about 4% when combined as described.

EXAMPLE 3

A third sheet material 10 was made including the same elements as the sheet material of Example 1 except that the base layer 13 of the sign tape was a plastic film of polycarbonate, 2 mils thick and adhesive layer 15 was 2 mils thick. The base and scrim layers of the sign tape had a tear propagation resistance of 230 grams and an elongation of about 39% when combined as described.

EXAMPLE 4

Another sheet material 10 was made including the same elements as the sheet material of Example 1 except that the scrim layer 14 of the sign tape was a 2 mil thick scrim of wetlaid nonwoven paper fibers and adhesive layer 15 was 2 mils thick. The base and scrim layers 13 and 14 of the sign tape of this Example had a tear propagation resistance of about 45 grams and an elongation of about 3.8% when combined as described previously.

EXAMPLE 5

A fifth sheet material 10 was made including the same elements as the sheet material of Example 1 except that the scrim layer 14 of the sign tape was a 3 mil thick layer of nonwoven polyester scrim and adhesive layer 15 was 2 mils thick. The base and scrim layers 13 and 14 of the sign tape of this Example had a tear propagation resistance of about 430 grams and an elongation of about 45% when combined as described previously.

The sheet materials of Examples 2-5 also provided satisfactory results when used to form signs with the apparatus described above in connection with FIG. 4.

2. FIG. 7

Figure 7:
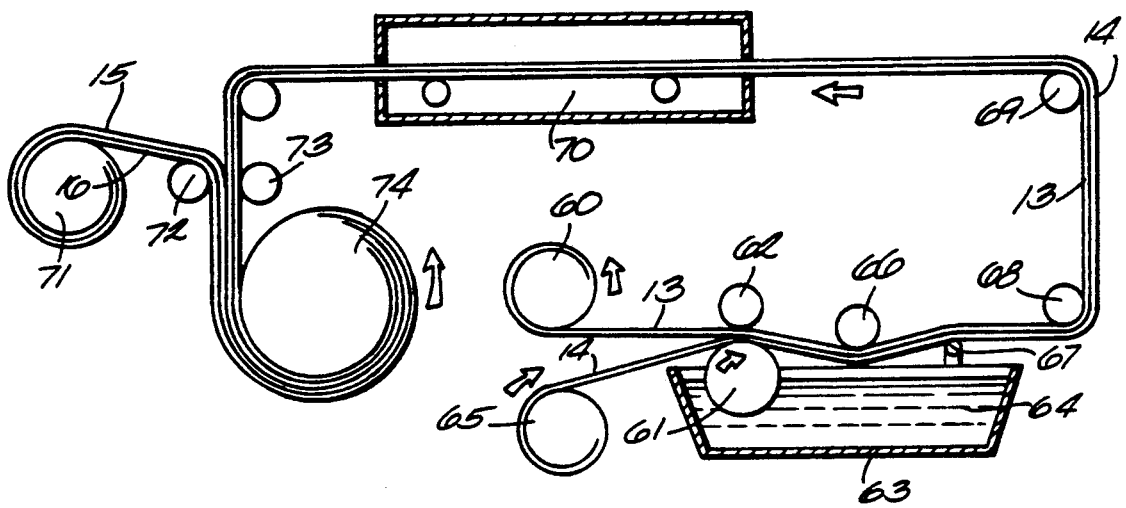
FIG. 7 is a schematic view illustrating a useful method for forming adhesive sheet materials of the invention.

Sign tape 21 of the type described above comprising a base, scrim and pressure sensitive adhesive layers is not commercially available, and we have developed a useful process for combining the scrim layer with the base layer, which is illustrated in FIG. 7.

A web of base layer 13 is unwound from a supply roll 60 thereof and led to the nip between applicator roll 61 and back-up roll 62 of a coating station including a pan 63 containing a bath of solvent 64. A web of scrim 14 is unwound from a supply roll 65 thereof and also led to the nip between rolls 61 and 62. The solvent from pan 63 is applied to the surface of scrim 14 that contacts roller 61. The combined webs of base layer 13 and scrim 14 are led under an idler roller 66 and over a wire wound rod 67 which meters the amount of solvent applied to scrim layer 14. The solvent penetrates through the pores of nonwoven scrim layer 14 so as to contact and soften or slightly dissolve the contacting surface of base layer 13, which enables the scrim to become embedded into the slightly softened surface of the base layer. The combined webs are led around rollers 68 and 69 and then through a drying oven 70 to drive off excess solvent. After drying, a web of liner 16 carrying adhesive layer 15 is withdrawn from supply roll 71 thereof and nipped in at rollers 72 and 73 so as to bond and transfer adhesive layer 15 over the scrim layer 14, following which the composite sheet material is wound onto rewind roll 74. The scrim layer 14 is thereby firmly embedded in or fused to the base layer 13 and cannot be separated from it without destroying the combined layers. Another method which can be used to combine the base layer and scrim layer in the desired fashion is to join the scrim layer to the base layer with a combination of heat and pressure, but we have found the solvent bonding method as described to be preferable at the present stage of our development work.

3. FIG. 8

Figure 8:
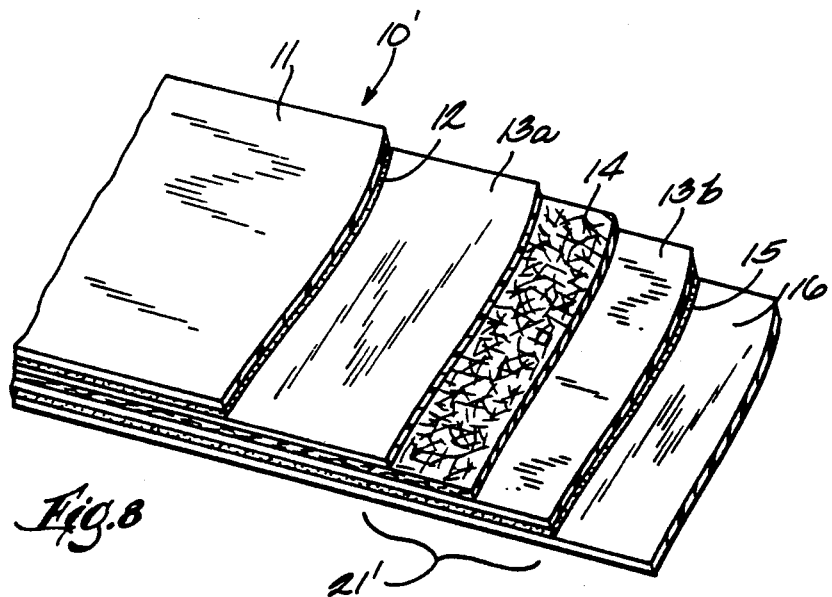
FIG. 8 is a perspective view, with portions broken away, of a second sheet material of the present invention.

FIG. 8 illustrates a second adhesive sheet material 10' constructed in accordance with the present invention. An element of sheet material 10' that is the same as a corresponding element of sheet material 10 previously described is identified by the same reference numeral.

Sheet material 10' includes a sign tape 21' in which the base layer 13 is made with two laminae 13a and 13b of plastic film and the scrim layer 14 is sandwiched between laminae 13a and 13b; thus, in this second embodiment, the scrim layer is embedded within the base layer. To produce this construction, scrim layer 14 can be joined first to either lamina 13a or 13b, such as by the solvent process illustrated and described with respect to FIG. 7, following which the other lamina can be joined to the scrim layer by heat and pressure lamination.

The remaining elements of sheet material 10' are the same as previously described. Carrier tape 20 is an exterior element of the composite construction, and its low tack adhesive layer 12 is releasably adhered to lamina 13a of base layer 13. Liner 16 is releasably adhered over the exposed surface of pressure sensitive adhesive layer 15 of sign tape 21'.

Sheet material 10' is used to form signs with an appropriate signmaking apparatus in the same manner as described above.

The construction of base layer 13 of sign tape 21' can reduce edge curl as compared to the base layer of sheet material 10 inasmuch as the laminae 13a and 13b along opposite surfaces of scrim layer 14 serve to cancel out the effects of shrinking or curling which may develop. Also, the two laminae can be of different colors which may be of interest in some sign applications, and the two laminae can be of dissimilar films to take advantage of differing functionalities of various films. Another advantage of sheet material 10' is that it has two smooth film surfaces along both sides of the sign tape, and either surface would be aesthetically pleasing when a sign made from the tape is applied to a transparent surface such as glass or plastic panel.

In the preceding description, base tapes 13 and 13' of sheet materials 10 and 10', respectively, have been illustrated and described as being made with pre-formed plastic films. However, the sheet materials can be made by casting plastic over one or both surfaces of the scrim layer. Thus, for example, sheet material 10 can be made by casting a layer of acrylic polymer onto a web of scrim. Thus, as used in the description and in the claims, the terms "plastic film" layer or lamina is defined to include both a pre-formed film or lamina of plastic and a film or lamina of plastic cast onto a scrim layer.

There has thus been described improved adhesive sheet materials of the type comprising a sign tape including a plastic film layer and a tacky pressure sensitive adhesive layer sandwiched between a carrier tape and a release liner. In accordance with our present invention, the plastic film layer, which may include one or more laminae, of the sign tape is reinforced with a layer of nonwoven scrim material which is wholly or partially embedded along a surface of the film layer. Our new constructions provide sheet materials wherein the sign tape has enhanced tear propagation resistance, which in turn results in excellent fracturing or cutting of the sign tape when a sign is defined therein with a signmaking machine. Also, separating waste material from a defined sign of the sign tape is enhanced by reason of the reinforcement of the plastic film layer and, further, the sign tape exhibits a reduced tendency to tear when a sign is separated from the balance of the sign tape.

The present invention has been illustrated and described above by reference to certain specific embodiments, but it is not intended to be limited to the details shown since various changes and modifications can be made to the exemplary constructions that will remain within the spirit and scope of the present invention.

We claim:

1. Adhesive sheet material for signmaking machines of the type comprising

[a] a carrier tape (20) including a carrier layer (11) and a low tack pressure sensitive adhesive layer (12) along a surface thereof,

[b] a sign tape (21) including a base layer (13) and a tacky pressure sensitive adhesive layer (15) along a first surface thereof, and

[c] a release liner (16), arranged with the adhesive layer (12) of the carrier tape (20) releasably adhered to a second surface of the base layer (13) of the sign tape (21) and the release liner (16) releasably adhered to the adhesive layer (15) of the sign tape (21), characterized in that the base layer (13) of the sign tape (21) comprises at least one plastic film lamina having a layer of nonwoven scrim (14) embedded therein and has an elongation of about 1% to 50% and a tear propagation resistance of at least about 40 to 1,000 grams, and one of the carrier tape (20) and release liner (16) has a high degree of elongation and the other has a low degree of elongation.

2. Adhesive sheet material according to claim 1 further characterized in that:

one of the carrier tape (20) and release liner (16) has an elongation of at least about 300% and the other has an elongation of about 30% to 100%.

3. Adhesive sheet material according to claim 1 further characterized in that:

the base layer (13) of the sign tape (21) includes one plastic film lamina and the layer of nonwoven scrim (14) is embedded along a surface thereof.

4. Adhesive sheet material according to claim 1 further characterized in that:

the base layer (13) of the sign tape (21) includes two plastic film laminae (13a, 13b) and the layer of nonwoven scrim (14) is embedded between said laminae (13a, 13b).

5. An adhesive sheet material according to any one of claims 1-4 further characterized in that:

the nonwoven scrim layer (14) is about 1 to 4 mils thick and comprises polyester, paper, glass, polyolefin or nylon fibers.

6. An adhesive sheet material according to any one of claims 1-4 further characterized in that:

the plastic film lamina of the base layer (13) of the sign tape (21) includes acrylic film, polystyrene film or polycarbonate film.

7. An adhesive sheet material according to any one of claims 1-4 further characterized in that:

the carrier tape (20) has an adhesion to the second surface of the sign tape (21) of about 140 to 450 grams/inch, and the release liner (16) has an adhesion to the adhesive layer (15) of the sign tape (21) less than the adhesion of the carrier tape (20) to the sign tape (21).

8. An adhesive sheet material according to any one of claims 1-4 further characterized in that:

the carrier tape (20) has an elongation of about 30% to 100%, the liner (16) has an elongation of at least about 300%, sign characters are formable in the sign tape (21) upon the application of character forming force along the liner (16), and a sign formed in the sign tape is separable from the sheet material along with the carrier tape (20).

* * * * *

UNITED STATES PATENT AND TRADEMARK OFFICE
CERTIFICATE OF CORRECTION

PATENT NO. : 5,124,187

DATED : June 23, 1992

INVENTOR(S) : Aeschbacher et al.

It is certified that error appears in the above-identified patent and that said Letters Patent is hereby corrected as shown below:

Col. 1, line 58    "are" should read --is--.

Col. 1, line 66    "Proctor" should read --Proctor,--.

Col. 2, line 18    "cuttability" should read --cutability--.

Col. 6, line 32    "cuttability" should read --cutability--.

Col. 8, line 36    "cuttability" should read --cutability--.

Col. 4, line 27    "sign" should read --a sign--.

Col. 4, line 67    "usefully" should read --useful--.

Col. 6, line 9     After "1", insert --%--.

Col. 7, line 11    "a" should read --an--.

Signed and Sealed this

Fourth Day of January, 1994

*Attest:*

BRUCE LEHMAN

*Attesting Officer*   *Commissioner of Patents and Trademarks*

UNITED STATES PATENT AND TRADEMARK OFFICE
CERTIFICATE OF CORRECTION

Patent No.    : 5,124,187
Dated         : June 23, 1992
Inventor(s)   : Aeschbacher, et al.

It is certified that error appears in the above-identified patent and that said Letters Patent is hereby corrected as shown below:

Title page, item:   [73] Assignee: Brady USA, Inc.-- should be inserted above "[21] Appl. No. 595,079.

--Richard J. Kiley-- should read "Edward J. Killey". --.

Signed and Sealed this

First Day of November, 1994

Attest:

BRUCE LEHMAN

Attesting Officer

Commissioner of Patents and Trademarks